United States Patent Office 2,768,171
Patented Oct. 23, 1956

2,768,171

ACID STABILIZED ISOTHIOURONIUM DYESTUFFS

William Clarke, George Harold Keats, Raymond Thornton, and Clifford Wood, Blackley, Manchester, England, assignors to Imperial Chemical Industries Limited, a corporation of Great Britain No Drawing. Application March 21, 1952,
Serial No. 277,922

Claims priority, application Great Britain March 28, 1951

9 Claims. (Cl. 260—314.5)

This invention relates to dyestuff compositions and more particularly to stable compositions of dyestuffs which contain isothiouronium salt groups.

In British specification Nos. 576,270, 587,636 and 613,980 processes are described for the manufacture of dyestuffs which contain isothiouronium salt groups attached through methylene linkages to aromatic nuclei, and in British specification No. 633,160 processes were described for applying such dyestuffs locally to textile material or paper by spraying, painting or printing. In the processes described the dyestuffs were applied in the form of aqueous solutions or printing pastes in the presence of a weakly acidic substance and the textile material or paper was treated with an alkaline substance before, during or after the application of the dyestuff. The isothiouronium salt groups must be sufficiently reactive for them to be decomposed during the printing and/or subsequent steaming processes in order that the dyestuff can be completely fixed on the textile material or paper, but at the same time it is desirable that the dyestuffs should be sufficiently stable to ensure that no decomposition occurs during storage, especially in tropical climates.

We have now found that by mixing the dyestuffs with certain water-soluble acidic substances which are solid at temperatures below 80° C., the stability of the dried dyestuffs on storage can be improved without serious harmful effects on the fixation of the dyestuff during the printing and subsequent processing.

According to our invention we provide new solid compositions of dyestuffs which comprise one or more dyestuffs which contain isothiouronium salt groups attached through methylene linkages to aromatic nuclei and one or more acidic substances from the class consisting of aliphatic dicarboxylic acids, alkali metal bisulphates and hydroxy-acids of boron.

The proportion of acidic substance to be used in the composition will depend on the nature of the dyestuff and of the acidic substance, but in general the proportion should preferably be between 0.1 part and 5 parts per part of dyestuff, but proportions not greater than 1 part per part of dyestuff are usually convenient in practice and proportions less than 0.1 part per part of dyestuff, for example down to 0.01 part per part of dyestuff, may sometimes be used.

The compositions may optionally contain other water-soluble substances normally used for standardising dyestuff powders such as dextrin or inorganic salts, for example sodium sulphate or sodium chloride. The dyestuffs may be for example of the phthalocyanine, azo, anthraquinone or other polynuclear series.

The acidic substances used in our invention are stable under the storage conditions, they do not give insoluble salts with the dyestuffs and they are free from powerful oxidising or reducing action on the dyestuffs.

Aliphatic dicarboxylic acids containing up to 6 carbon atoms are conveniently used in the invention. Specific examples of suitable acids are oxalic, succinic, malic, maleic, tartaric, glutaric and adipic acids.

When the anhydride of the acid is readily available, for example maleic anhydride, the anhydride may be added to the dyestuff and then hydrolysed to the acid in situ in the mixture.

Ortho-, meta- or pyroboric acids can be used in our new dyestuff compositions (or made in situ by adding boron trioxide and hydrolysing) but orthoboric acid, commonly known as boric acid, has outstanding value for use in the invention. Sufficient boric acid can be added to provide adequate stability without giving rise to solubility difficulties when the dyestuff is subsequently dissolved for application to textile material or paper, and boric acid has practically no adverse effect on the physical form of the dyestuff powders.

According to a preferred feature of our invention we provide new solid compositions of dyestuffs which comprise boric acid and one or more dyestuffs which contain isothiouronium salt groups attached through methylene linkages to aromatic nuclei.

The compositions of our invention may be made by mixing or grinding together the acidic substances and dyestuffs and optionally the other substances used for standardising, to obtain an intimate mixture of the components, or if desired the acidic substances and dyestuffs may be mixed in aqueous or other liquid medium, one or more of the substances being in solution if desired, and the mixture then dried if necessary to give a solid composition. Alternatively the dyestuff may be formed in the presence of the acidic substance, for example by heating a dyestuff intermediate carrying one or more chloromethyl groups attached to an aromatic nucleus with a thiourea in the presence of boric acid and if desired in the presence of water or a hydrated salt, for example sodium sulphate, or other diluent.

The invention is illustrated but not limited by the following examples in which the parts are by weight:

Example 1

33 parts of the dyestuff obtained by reacting copper tri-(chloromethyl)-phthalocyanine with tetramethylthiourea are thoroughly mixed by grinding with 18 parts of boric acid and 49 parts of anhydrous sodium sulphate. When the dyestuff powder so obtained is stored for 48 hours at 80° C., no appreciable decomposition of the dyestuff can be detected. 0.5 part of the dyestuff after storage dissolves readily in a mixture of 5 parts of glacial acetic acid and 17 parts of water. When the solution is made up into a printing paste and printed on cotton material, as described in Example 1 of British specification No. 633,160, a bright greenish-blue print of good fastness properties is obtained. The shade and strength of the print are similar to the shade and strength of a print obtained with the dyestuff mixture before storage or with the dyestuff before storage in the absence of boric acid. If the 18 parts of boric acid in the above composition are replaced by a further 18 parts of anhydrous sodium sulphate and the mixture is stored in a sealed container at 80° C., for 48 hours, an appreciable amount of insoluble dyestuff is formed and the dyestuff gives very weak shades when printed on cotton material and specks of insoluble dyestuff can be seen on the print.

Example 2

66 parts of the dyestuff obtained by reacting copper tri-(chloromethyl)-phthalocyanine with tetramethylthiourea are thoroughly mixed by grinding with 34 parts of boric acid. When the composition so obtained is stored in a sealed container at 80° C., for 96 hours no appreciable decomposition of the dyestuff occurs and the prints obtained from the dyestuff are equal in shade and strength to those obtained from the same dyestuff before storage. When the dyestuff is stored in a sealed container at 80° C., in the absence of boric acid, a considerable amount of insoluble material is formed and only weak prints are obtained.

Example 3

66 parts of the dyestuff obtained by reacting copper tri-(chloromethyl)-phthalocyanine with tetramethylthiourea are thoroughly mixed by grinding with 34 parts of a mixture of 78.5 parts of succinic acid to 21.5 parts adipic acid. No appreciable decomposition occurs when the mixture of dyestuff and acids is stored in a sealed container at 80° C., for 72 hours.

Example 4

66 parts of the dyestuff obtained by reacting di-(chloromethyl)- 4:4'- di -(6 - methyl - benzthiazyl-2)-azobenzene with tetramethylthiourea are thoroughly mixed by grinding with 33 parts of boric acid. No appreciable decomposition occurs when the mixture is stored in a sealed container at 80° C., for 72 hours.

Example 5

An intimately ground mixture of 72 parts of copper tri(chloromethyl)phthalocyanine, 43 parts of tetramethylthiourea, 18 parts of sodium sulphate crystals and 15 parts of boric acid is heated in a closed vessel at 70–75° C., for 3 hours. The product is a mixture of dyestuff, sodium sulphate and boric acid with a little free tetramethylthiourea. It is still soluble in water after it has been stored for 14 days at 80° C., in a closed container, whereas a similar preparation in which the boric acid is omitted becomes converted to an insoluble product when stored under these conditions.

Example 6

An intimately ground mixture of 72 parts of copper tri(chloromethyl)phthalocyanine, 43 parts of tetramethylthiourea and 13 parts of boric acid is well mixed with 11 parts of water. The mixture is heated in a closed vessel at 70–75° C., for 3 hours. The product is a mixture of water-soluble dyestuff, boric acid and a little free tetramethylthiourea. It is still soluble in water after it has been stored for 14 days at 80° C., in a closed container, whereas a similar preparation in which the boric acid is omitted becomes converted by similar storage to a product insoluble in water.

Example 7

9 parts of the dyestuff obtained by reacting copper tri-(chloromethyl)-phthalocyanine with tetramethylthiourea are mixed thoroughly by grinding with 1 part of succinic acid. When the dyestuff powder so obtained is stored for 14 days at 70° C., in a closed container, the product is still soluble in water to give a clear solution. The original dyestuff alone when stored under identical conditions is completely decomposed to give a product insoluble in water.

Example 8

96 parts of the dyestuff obtained by reacting copper tri(chloromethyl)-phthalocyanine with tetramethylthiourea are mixed thoroughly by grinding with 4 parts of sodium bisulphate. When the dyestuff powder is stored for 150 hours at 60° C., no appreciable decomposition can be detected. The shade and strength of a print obtained on cotton from the stored dyestuff by the process of Example 1 of United Kingdom specification No. 633,160 is similar to the shade and strength of a print obtained from the unstored dyestuff. If the sodium bisulphate is omitted the strength of the print obtained after storage is about one half of that which is obtained before storage.

Example 9

An intimately ground mixture of 57 parts of di(chloromethyl)-4:4'-di(6-methyl-benzthiazyl-2)-azobenzene, 33 parts of tetramethylthiourea and 9 parts of boric acid is well mixed with 13.5 parts of water. The mixture is heated in a closed vessel at 75° C., for 3 hours. The resulting product is dried in vacuo and powdered. It can be stored in a closed container for 14 days at 80° C., without appreciable decomposition and a print made from the stored product is similar in shade and strength to that obtained from the unstored product. In the absence of the boric acid the soluble dyestuff is converted by storage for 14 days at 80° C., to a product completely insoluble in water.

Example 10

An intimately ground mixture of 160 parts of tri(chloromethyl)-tetra-4-tolylmercapto copper phthalocyanine, 43.5 parts of tetramethylthiourea and 20 parts of tartaric acid is well mixed with 12 parts of water. The mixture is heated in a closed vessel at 70–75° C., for 3 hours and the resulting water-soluble dyestuff is dried and powdered. When it has been stored for 3 weeks at 70° C., in a closed container, the dyestuff still gives a clear solution in water, whereas a similar preparation not containing tartaric acid becomes insoluble in water after it has been stored for 2 days at 70° C.

Example 11

An intimately ground mixture of 160 parts of tri(chloromethyl)-tetra-4-tolylmercapto copper phthalocyanine, 43.5 parts of tetramethylthiourea, 40 parts of sodium sulphate crystals and 24 parts of boric acid is heated in a closed vessel at 70–75° C., for 3 hours. The product it dried and powdered. It is soluble in water and remains soluble after it has been stored for 3 weeks at 70° C. A similar preparation in which the boric acid is omitted becomes converted to an insoluble material after it has been stored for 2 days at 70° C.

Example 12

66 parts of the dyestuff obtained by reacting bis-chloromethyl-toluidino-acedianthrone with tetramethylthiourea and 33 parts of boric acid are ground together. No appreciable decomposition occurs when the mixture is stored in a sealed container at 80° C., for 72 hours. When the dyestuff is stored in a sealed container at 80° C., in the absence of boric acid, a considerable amount of insoluble material is formed and the product gives weak prints when printed onto cotton cloth.

Example 13

80 parts of the dyestuff obtained by reacting bis-chloromethyl-isodibenzanthrone with tetramethylthiourea and 20 parts of boric acid are ground together. No appreciable decomposition occurs when the mixture is stored in a sealed container at 80° C., for 72 hours. When the dyestuff is stored in a sealed container at 80° C., in the absence of boric acid, a considerable amount of insoluble material is formed.

What we claim is:

1. A solid dyestuff composition stabilized against decomposition which comprises at least one dyestuff containing isothiouronium salt groups attached through methylene linkages to aromatic nuclei and as a stabilizer therefor, at least one acidic substance selected from the group consisting of aliphatic hydrocarbon discarboxylic acids containing up to six carbon atoms, aliphatic hydroxy-hydrocarbon dicarboxylic acids containing up to six carbon atoms, alkali metal bisulphates and hydroxy-acids of boron, said dyestuff being selected from the group consisting of azo benzene dyestuffs, phthalocyanine dyestuffs and anthraquinone dyestuffs.

2. The solid dyestuff composition of claim 1 wherein the proportion of acidic substance is between 0.1 part and 5 parts per part of dyestuff.

3. The solid dyestuff composition of claim 1 wherein the acidic substance is a hydroxy acid of boron.

4. The solid dyestuff composition of claim 1 wherein said acidic substance is boric acid.

5. The solid dyestuff composition of claim 1 wherein the acidic substance is meta boric acid.

6. The solid dyestuff composition of claim 1 wherein the acidic substance is pyroboric acid.

7. The solid dyestuff composition of claim 1 wherein the acidic substance is an alkali metal bisulphate.

8. The solid dyestuff composition of claim 1 wherein the acidic substance is succinic acid.

9. The solid dyestuff composition of claim 1 wherein the acidic substance is glutaric acid.

References Cited in the file of this patent

UNITED STATES PATENTS

| | | |
|---|---|---|
| 2,361,301 | Libby et al. | Oct. 24, 1944 |
| 2,416,387 | Haddock et al. | Feb. 25, 1947 |
| 2,544,825 | Coffey et al. | Mar. 13, 1951 |
| 2,599,371 | Chadderton | June 3, 1952 |